(12) United States Patent
Watson et al.

(10) Patent No.: US 7,368,142 B2
(45) Date of Patent: May 6, 2008

(54) NATURAL SWEETENER

(75) Inventors: Tommy Stanley Watson, Dunedin, FL (US); Brenda F. Watson, Dunedin, FL (US)

(73) Assignee: Renew Life Formulas, Inc., Clearwater, FL (US)

( * ) Notice: Subject to any disclaimer, the term of this patent is extended or adjusted under 35 U.S.C. 154(b) by 916 days.

(21) Appl. No.: 10/210,439

(22) Filed: Aug. 1, 2002

(65) Prior Publication Data

US 2004/0022913 A1 Feb. 5, 2004

(51) Int. Cl.
*A23L 1/236* (2006.01)

(52) U.S. Cl. ...................................... 426/548; 426/658

(58) Field of Classification Search ................ 426/548, 426/615, 658, 804
See application file for complete search history.

(56) References Cited

OTHER PUBLICATIONS

Hugill, J.A.C., AN 1985(12):L0132 FSTA abstracting Sweeteners. Industria Azucarera, 1981, No. 1003, 46-52.*
Madley, R.H., How sweet it is(n't). Nutraceuticals World, 2002, (Jan.-Feb.), 5(1), 54-65.*
HerbaSweet—a non-caloric, all natural liquid sweetener, http://www.bytheplanet.com/Products/Chinesemedicine/Herbasway/herbasweet.htm.*
H&F Corporate Group Company: The History, http://www.herbstreith-fox.de/en/hf_gruppe/firmengeschichte.htm.*

* cited by examiner

*Primary Examiner*—Leslie Wong
(74) *Attorney, Agent, or Firm*—Fraser, Clemens, Martin, Miller LLC; Donald R. Fraser

(57) ABSTRACT

A natural sweetener formulation comprises fructose, lo han, and inulin.

5 Claims, No Drawings

NATURAL SWEETENER

FIELD OF THE INVENTION

The invention relates generally to a natural sweetener composition. More particularly, the invention is directed to a natural sweetener formulation that additionally helps the body's balance of intestinal flora.

BACKGROUND OF THE INVENTION

Natural sweetener formulations have become well-known in the art. Many are prepared from plant materials, such as for example an extract from lo han kuo fruit, and combined with conventional sweeteners like glucose or fructose. Such sweeteners, however, do not build or assist the balancing of the human body's intestinal flora.

It would be desirable to prepare a natural sweetener formulation having the added benefit of promoting the growth of beneficial intestinal micro flora, for improved operation of the gastrointestinal tract.

SUMMARY OF THE INVENTION

Accordant with the present invention, an improved natural sweetener formulation has surprisingly been Discovered. It comprises fructose, lo han, and inulin.

The inventive natural sweetener formulation is particularly suited as a sweetening agent for packaged foods, and for hot and cold beverages.

DETAILED DESCRIPTION OF THE PREFERRED EMBODIMENT

The present invention is directed to a natural sweetener formulation comprising fructose, lo han, and inulin.

Fructose is a well-known sweetener, commonly called "fruit sugar." Fructose remains in the intestinal tract for a longer period of time than conventional sweeteners such as, for example, sucrose, thereby providing time-released energy to the human body. Fructose may be present in the inventive natural sweetener formulation at a concentration ranging from about 85 to about 98 weight percent. Preferably, the concentration of fructose is about 95 weight percent.

Lo han is the well-known extract from the lo han kuo fruit, and includes the natural sweetening agent mogroside which is 300 times sweeter than cane sugar. Lo han may be present in the inventive natural sweetener formulation at a concentration ranging from about 1 to about 10 weight percent. Preferably, the concentration of lo han is about 3 weight percent.

Inulin is a well-known natural carbohydrate that helps to promote and balance the level of beneficial flora in the body's intestinal tract. Inulin may be present in the inventive natural sweetener formulation at a concentration ranging from about 1 to about 5 weight percent. Preferably, the concentration of inulin is about 2 weight percent.

The ingredients that comprise the inventive natural sweetener formulation may be mixed and granulated by conventional techniques. The resulting natural sweetener formulation may then be added to foods, or hot or cold drinks, in place of conventional sweeteners. The inventive natural sweetener formulation promotes the growth of specific intestinal flora perceived to be beneficial to overall health.

The invention is more easily comprehended by reference to the specific embodiments recited hereinabove which are representative of the invention. It must be understood, however, that the specific embodiments are provided only for the purpose of illustration, and that the invention may be practiced otherwise than as specifically illustrated without departing from its spirit and scope.

What is claimed is:

1. A natural sweetener formulation, consisting essentially of:
   from about 85 to about 98 weight percent fructose;
   from about 1 to about 10 weight percent lo han; and
   from about 1 to about 5 weight percent inulin.

2. The natural sweetener formulation according to claim 1, wherein the concentration of fructose is about 95 weight percent.

3. The natural sweetener formulation according to claim 1, wherein the concentration of lo han is about 3 weight percent.

4. The natural sweetener formulation according to claim 1, wherein the concentration of inulin is about 2 weight percent.

5. A natural sweetener formulation, consisting essentially of:
   about 95 weight percent fructose;
   about 3 weight percent lo han; and
   about 2 weight percent inulin.

* * * * *